United States Patent
Rashev (10) Patent No.: US 9,710,164 B2
(45) Date of Patent: Jul. 18, 2017

(54) DETERMINING A CAUSE FOR LOW DISK SPACE WITH RESPECT TO A LOGICAL DISK

(71) Applicant: INTERNATIONAL BUSINESS MACHINES CORPORATION, Armonk, NY (US)

(72) Inventor: Christian S. Rashev, Brno (CZ)

(73) Assignee: International Business Machines Corporation, Armonk, NY (US)

(*) Notice: Subject to any disclaimer, the term of this patent is extended or adjusted under 35 U.S.C. 154(b) by 254 days.

(21) Appl. No.: 14/598,340

(22) Filed: Jan. 16, 2015

(65) Prior Publication Data
US 2016/0210056 A1 Jul. 21, 2016

(51) Int. Cl.
*G06F 12/00* (2006.01)
*G06F 3/06* (2006.01)
(Continued)

(52) U.S. Cl.
CPC ............ *G06F 3/0608* (2013.01); *G06F 3/067* (2013.01); *G06F 3/0653* (2013.01);
(Continued)

(58) Field of Classification Search
CPC ............ G06F 11/3006; G06F 11/3034; G06F 11/3409; G06F 3/0608; G06F 3/0653;
(Continued)

(56) References Cited

U.S. PATENT DOCUMENTS 6,023,507 A   2/2000 Wookey
7,237,137 B2  6/2007 Goeller et al.
(Continued)

FOREIGN PATENT DOCUMENTS

EP   1471428   10/2004
EP   1649377   2/2013
(Continued)

OTHER PUBLICATIONS

System Administration Toolkit: Monitoring disk space and usage; Jul. 13, 2006; retrieved from the Internet on Sep. 5, 2014; URL: http://www.ibm.com/developerworks/aix/library/au-satdiskmon.html; 9 pages.

*Primary Examiner* — Mardochee Chery
(74) *Attorney, Agent, or Firm* — Schmeiser, Olsen & Watts; John Pivnichny (57) ABSTRACT

A method and system for determining a cause for low disk space with respect to a logical disk is provided. The method includes identifying software activities associated with a computing system linked to a file system comprised by a disk storage device. Representations for the software activities are identified with respect to the file system and associated objects are defined. The objects impact available free space on a logical disk of the disk storage device and each software activity is linked with an associated object. An amount of disk space of the logical disk occupied by each object is determined. An impact of each object is analyzed with respect to an amount of available free disk space and a specific cause(s) for the file system exceeding the available free space is determined.

18 Claims, 6 Drawing Sheets

(51) Int. Cl.
  *G06F 11/30* (2006.01)
  *G06F 11/14* (2006.01)
  *G06F 11/34* (2006.01)
  *G06F 17/30* (2006.01)

(52) U.S. Cl.
  CPC ...... *G06F 11/3006* (2013.01); *G06F 11/3034* (2013.01); *G06F 11/3409* (2013.01); *G06F 11/1435* (2013.01); *G06F 11/1471* (2013.01); *G06F 11/3495* (2013.01); *G06F 17/3023* (2013.01); *G06F 17/30088* (2013.01); *G06F 2201/81* (2013.01)

(58) Field of Classification Search
  CPC .. G06F 3/067; G06F 11/1435; G06F 11/1471; G06F 17/30088; G06F 17/3023; G06F 11/3495
  See application file for complete search history.

(56) References Cited

U.S. PATENT DOCUMENTS

| | | | |
|---|---|---|---|
| 7,590,666 | B2 | 9/2009 | Korman et al. |
| 7,606,871 | B2 | 10/2009 | Kawamoto et al. |
| 8,127,010 | B2 | 2/2012 | Sinha |
| 8,195,797 | B2 | 6/2012 | Sullivan |
| 8,381,033 | B2 | 2/2013 | Franklin |
| 8,838,648 | B2 | 9/2014 | Sismanis et al. |
| 9,430,492 | B1 * | 8/2016 | Bono ................ G06F 17/30221 |
| 2005/0005005 | A1 | 1/2005 | Styles et al. |
| 2005/0120242 | A1 * | 6/2005 | Mayer .................... G06F 21/56 726/4 |
| 2008/0126881 | A1 | 5/2008 | Bruckhaus |
| 2010/0257092 | A1 | 10/2010 | Einhorn |
| 2012/0072582 | A1 | 3/2012 | Kline |
| 2012/0110582 | A1 | 5/2012 | Ferdous et al. |
| 2012/0215905 | A1 | 8/2012 | Mandell |
| 2012/0233106 | A1 | 9/2012 | Reich, Jr. |
| 2012/0272099 | A1 | 10/2012 | Keith, Jr. |
| 2013/0031238 | A1 | 1/2013 | Grossklas et al. |
| 2014/0047277 | A1 | 2/2014 | Keith, Jr. |
| 2014/0195670 | A1 | 7/2014 | Jain et al. |

FOREIGN PATENT DOCUMENTS

| | | |
|---|---|---|
| WO | 2006037211 | 4/2006 |
| WO | 2007139963 | 12/2007 |
| WO | 2008109537 | 9/2008 |
| WO | 2009010950 | 1/2009 |
| WO | 2009061432 | 5/2009 |
| WO | 2010049732 | 5/2010 |
| WO | 2012114215 | 8/2012 |

* cited by examiner

DETERMINING A CAUSE FOR LOW DISK SPACE WITH RESPECT TO A LOGICAL DISK

FIELD

The present invention relates generally to a method for determining a cause for a low amount of available disk space and in particular to a method and associated system for determining a cause for a low amount of available disk space with respect to a logical disk.

BACKGROUND

Determining storage issues typically includes an inaccurate process with little flexibility. Resolving storage issues may include a complicated process that may be time consuming and require a large amount of resources. A typical monitoring system associated with a storage system does not include the ability to recognize a cause associated with a low amount of storage space and therefore is unable to execute most appropriate corrective actions to remediate the issue caused by low disk space. Accordingly, there exists a need in the art to overcome at least some of the deficiencies and limitations described herein above.

SUMMARY

A first aspect of the invention provides a method comprising: identifying, by a computer processor of a computing system, software activities associated with software of an endpoint computing system linked to a file system comprised by a disk storage device; identifying, by the computer processor, representations for the software activities with respect to the file system; defining, by the computer processor, objects associated with the file system, wherein the objects are associated with functions and features of the software activities, wherein the objects impact available free space on a logical disk of the disk storage device; linking, by the computer processor, each software activity of the software activities with at least one associated object of the objects; determining, by the computer processor, an amount of disk space of the logical disk of the disk storage device occupied by each object of the objects; analyzing, by the computer processor, an impact of each object of the objects with respect to an amount of available free disk space of the logical disk of the disk storage device; and determining, by the computer processor based on results of the linking, a specific cause for the file system exceeding the available free space.

A second aspect of the invention provides a computing system comprising a computer processor coupled to a computer-readable memory unit, the memory unit comprising instructions that when executed by the computer processor implements a method comprising: identifying, by the computer processor, software activities associated with software of an endpoint computing system linked to a file system comprised by a disk storage device; identifying, by the computer processor, representations for the software activities with respect to the file system; defining, by the computer processor, objects associated with the file system, wherein the objects are associated with functions and features of the software activities, wherein the objects impact available free space on a logical disk of the disk storage device; linking, by the computer processor, each software activity of the software activities with at least one associated object of the objects; determining, by the computer processor, an amount of disk space of the logical disk of the disk storage device occupied by each object of the objects; analyzing, by the computer processor, an impact of each object of the objects with respect to an amount of available free disk space of the logical disk of the disk storage device; and determining, by the computer processor based on results of the linking, a specific cause for the file system exceeding the available free space.

A third aspect of the invention provides a computer program product, comprising a computer readable hardware storage device storing a computer readable program code, the computer readable program code comprising an algorithm that when executed by a computer processor of a computing system implements a method, the method comprising: identifying, by the computer processor, software activities associated with software of an endpoint computing system linked to a file system comprised by a disk storage device; identifying, by the computer processor, representations for the software activities with respect to the file system; defining, by the computer processor, objects associated with the file system, wherein the objects are associated with functions and features of the software activities, wherein the objects impact available free space on a logical disk of the disk storage device; linking, by the computer processor, each software activity of the software activities with at least one associated object of the objects; determining, by the computer processor, an amount of disk space of the logical disk of the disk storage device occupied by each object of the objects; analyzing, by the computer processor, an impact of each object of the objects with respect to an amount of available free disk space of the logical disk of the disk storage device; and determining, by the computer processor based on results of the linking, a specific cause for the file system exceeding the available free space.

The present invention advantageously provides a simple method and associated system capable of determining causes for storage issues.

DETAILED DESCRIPTION

Figure 1:
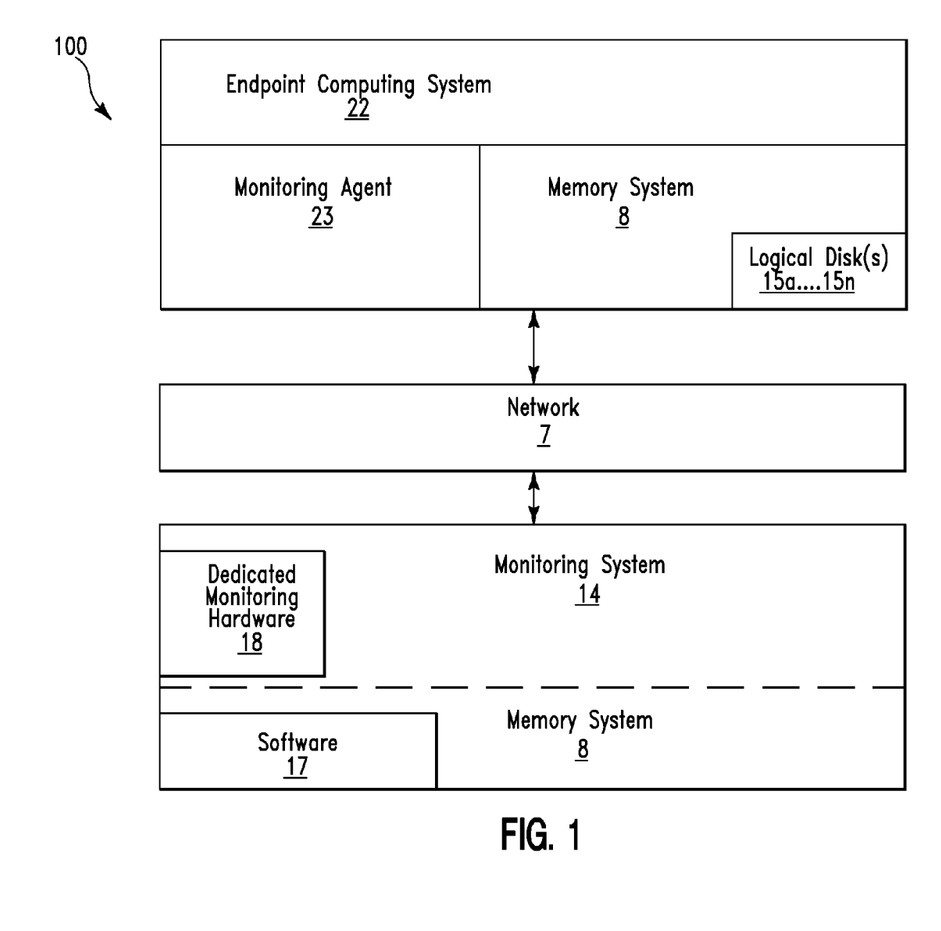
FIG. 1 illustrates a monitoring system for enabling a process for automatically recognizing a cause for an alert triggered by event associated with low disk space on a logical disk, in accordance with embodiments of the present invention.

FIG. 1 illustrates a monitoring system 100 for enabling a process for automatically to recognizing a cause for an alert triggered by event associated with low disk space on a logical disk, in accordance with embodiments of the present invention. System 100 allows an endpoint monitoring and management process for automatically to recognizing the specific causes for low disk space on a logical disk. Additionally, system 100 is capable of automatically applying associated corrective actions.

System 100 of FIG. 1 includes an endpoint computing system 22 connected through a network 7 to a monitoring system 14. An endpoint computing system 22 is defined herein as an entry point to a service, a process, or a queue or topic destination within service-oriented architecture (SOA). Endpoint computing system 22 comprises an Internet-capable computer hardware device on a TCP/IP network. Endpoint computing system 22 may include any type of computing system including, inter alia, a desktop computer, a laptop computer, a smart phone, a tablet computer, a printer, a POS terminal, a smart meter, etc. Endpoint computing system 22 may include any type of device comprising a hardware data storage device (e.g., a hard disk drive) comprising logical disks. Endpoint computing system 22 comprises a disk storage system (e.g., a hard disk drive) including logical disks 15a . . . 15n. Additionally, endpoint computing system 22 comprises a monitoring agent 23 (software and/or hardware) for remotely enabling monitoring system 14 to collect data associated with various parameters of endpoint computing system 22. Monitoring system 14 includes a CPU, dedicated monitoring hardware 18, and a memory system 8. Memory system 8 may include a single memory system. Alternatively, memory system 8 may include a plurality of memory systems. Memory system 8 includes software 17. Software 17 in combination with dedicated monitoring hardware 17 enables monitoring system 14 to monitor and invoke changes to endpoint computing system 22 based on a (recognized or discovered by monitoring system 14) cause for an alert triggered by an event associated with low disk space on a logical disks 15a . . . 15n. Network 7 may include any type of network including, inter alia, a local area network, (LAN), a wide area network (WAN), the Internet, a wireless network, etc. Software 17 in combination with dedicated monitoring hardware 17 recognizes a cause for an event associated with low disk space on a logical disk as follows:
1. Receiving a notification associated with free storage space of logical disks 15a . . . 15n of disk storage system 15.
2. Populating logical disks 15a . . . 15n of disk storage system 15 with objects (logically linked to a software activity) comprised by files and folders.
3. Receiving a first list of object (files and folders) stored in logical disks 15a . . . 15n of disk storage system 15 and a second list of logically associated software activities.
4. Receiving a mapping of elements of the first list to a single element from the second list.
5. Periodically monitoring a size of the elements of the first list to track storage space consumption of storage space within logical disks 15a . . . 15n of disk storage system 15.
6. Selecting (based on tracked storage consumption data and when available storage space in a logical disk falls below a pre-defined limit) objects (files and folders) from the first list. The objects (files and folders) are associated with storage space consumption increased beyond a pre-defined limit during a predefined time window in the past.
7. Creating a report associated with the selected objects (files and folders). The selected objects are linked to software activities. The report includes associated activities listed together with the selected objects and a respective amount of increased storage space consumption.

Therefore, system 100 enables a process for automatically recognizing a cause for alerts triggered by an event associated with available disk space on logical disks 15a . . . 15n based on logical links established between the objects (such as, e.g., files and folders on a file system located on a logical disk) and software activities installed on the endpoint operating system (OS) and applications, respectively. The software activities include processes interacting with the file system. Additionally, the software activities may include any user interaction with the installed OS and applications.

A logical link is used to determine a reason for changes within the objects associated with the software activities. A logical link illustrates a behavior of the activity causing changes to the objects on the file system. Based on an operational behavior of an activity, a logical link provides information (e.g., a type of corrective action to be performed to remediate low disk space on a logical disk) associated with the activity. The information is analyzed by monitoring system so that monitoring system 14 may automatically perform reactive or proactive actions to remediate low disk space on logical disks 15a . . . 15n.

Monitoring system 14 automatically (without human performed analysis) determines a cause(s) for low disk space and enables automatic remediation based on the determined causes.

For example, a file system on a logical disk may include folders and files belonging to operating system folders and files, application software folders and files, user profile folders and files, and dedicated folders and files. The file system comprises a logical structure used to control access to storage capacity provided by a logical disk (e.g., logical disks 15a . . . 15n). Any software activity or user activity executed on an operating system level is linked within organized structure of objects represented on the file system by folders and files in the specified locations. Any of the software activities or user activities may cause changes in allocated disk space (e.g., due to an increase or decrease of occupied disk space by associated objects) and therefore the software activities or user activities may have an impact on the amount of available free disk space on the logical disk.

Reasons for low disk space are determined by tracking an impact on a total amount of available free disk space caused by determined changes in the disk space occupied by each defined object. When changes to the defined objects lead to a significant decrease in available free space, the changes are determined to comprise causes for low disk space. The causes are determined based on established logical links between software activities and defined objects.

In response of low disk space on a logical disk issue, system 100 identifies activities comprising patterns on the file system causing low disk space and determines a cause and optionally enabling a capability to apply associated most appropriate corrective actions to remediate the cause for low disk space.

Figure 2:
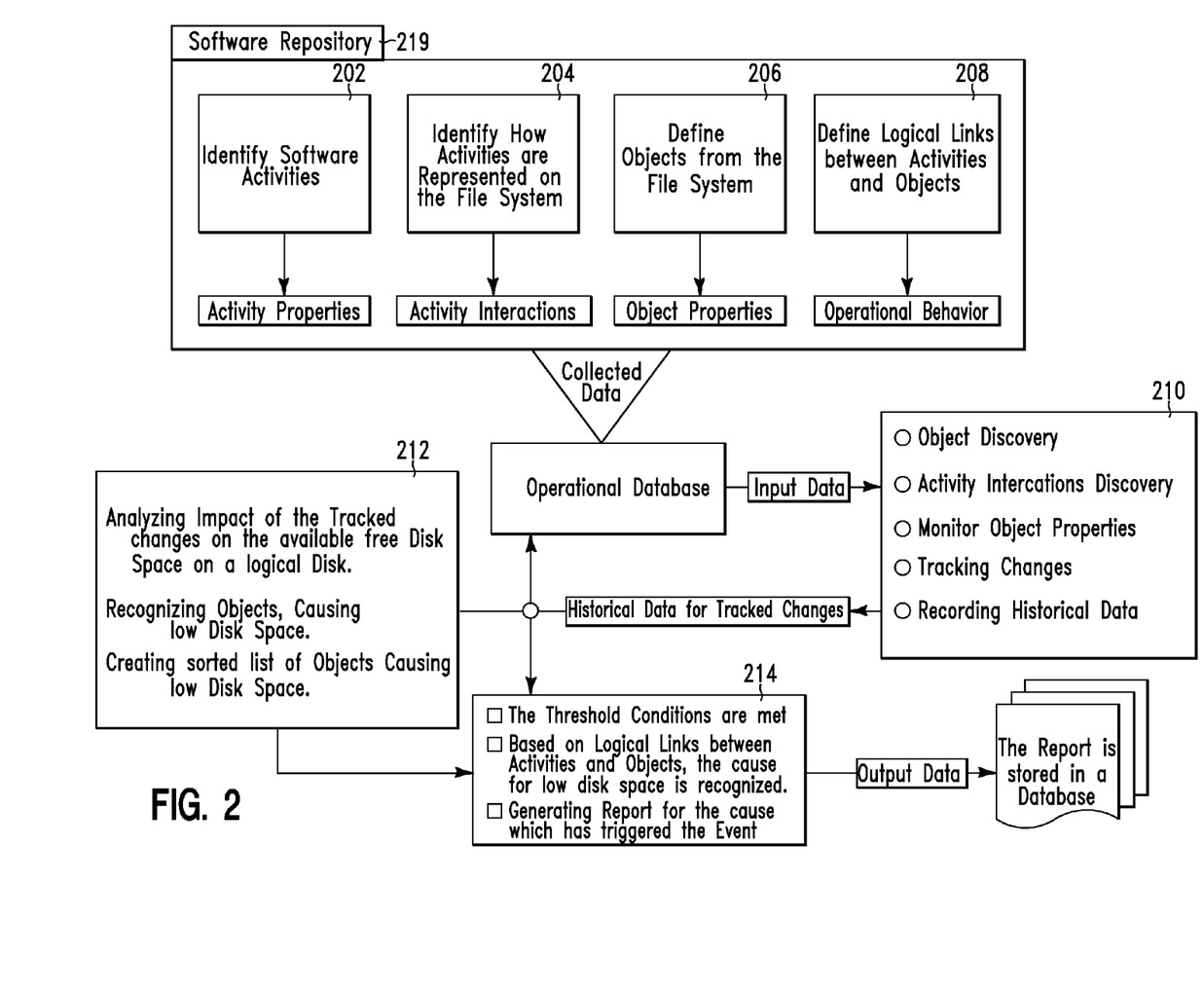
FIG. 2 illustrates a block diagram detailing a process flow enabled by the monitoring system of FIG. 1 for recognizing causes for low disk space on a logical disk, in accordance with embodiments of the present invention.

FIG. 2 illustrates a block diagram detailing a process flow enabled by system 100 of FIG. 1 for recognizing causes for low disk space on a logical disk, in accordance with embodiments of the present invention. Monitoring system 14 (of FIG. 1) enables a process with respect to a monitored endpoint (e.g., endpoint computing system 22 of FIG. 1). Input data is received by monitoring system 14 (of FIG. 1). The input data may include:
1. Definitions for software activities performed on the monitored endpoint.
2. Definitions associated with activity objects on a file system.

3. Logical links between defined software activities and associated defined objects on the file system.

Output data from monitoring system 14 (of FIG. 1) comprises an analysis determining a cause for low disk space on the logical disk. The following block sequence of steps illustrates the process for recognizing causes for low disk space on a logical disk: Block 202 identifies software activities (on monitored managed endpoints) performed by an installed operating system (OS), installed applications, and interacting user accounts. Software activities provide an implementation of functionality and features. The software activities are defined based on operating systems and applications documentation as well as on best practices to support the operating systems and applications. Each software activity is defined with associated properties. The properties may include, inter alia:
1. Activity <name>
2. Activity belongs to <OS/Software Application/User Profiles>
3. Activity is initiated by <feature(s)>
4. Activity provides <functionality>
5. Activity have own <process(es)/service(s)>
6. Activity <meta data>
7. Activity <other properties>

Collected information associated with defined software activities is stored within a software repository 219.

Block 204 identifies how the defined software activities are represented on the file system with organized structure of folders and files. Based on each software activity's functionality and features, associated folders and files located on the file system are identified and interactions between software activities and associated folders and files are determined. Types and levels of interactions may include, inter alia:
1. Object created
2. Object modified
3. Object accessed
4. Object locked by activity
5. Object deleted Collected information associated with the software activities and associated objects on the file system are stored within software repository 219.

Block 206 defines objects from the file system (e.g., files and folders) associated with the software activity's associated functionality and features. The objects are defined based on the collected information (i.e., from blocks 202 and 204) within the software repository 219 in accordance with operating system and application documentation. The associated software activities and objects on the file system are defined based on interactions with associated folders and files. Each object is defined with its properties. The properties may include, inter alia:
1. Object's<name definitions>
2. Path on the file system <object location>
3. Type of the object <folders/files/files & folders>
4. Patterns in the object <name>
5. Object's<extension>
6. Object's<meta data>
7. Object's<other properties>

All defined objects and their associated properties are stored within software repository 219.

Block 208 links (i.e., via logical links) each defined software activity with associated objects on the file system. Alternatively, block 208 links each defined activity with an associated group containing multiple objects. The logical links represent an operational behavior of each software activity and points to an interaction reason. The logical links are defined based on operating systems and applications support documentation and technical instructions.

The logical links may be classified for operational behavior as follows:
1. Work as designed <normal operation>
2. Fault in <module>
3. Exceeding <parameters>
4. Transition between <processes>
5. Debugging enabled by <process>

A logical link illustrates the behavior of an associated software activity causing changes to associated objects on the file system. Based on an operational behavior of the associated software activity, the logical link provides information associated with types of corrective actions to be performed to remediate low disk space on a logical disk (i.e., caused by the software activity). The aforementioned information may be used by system 100 automatically perform actions to remediate low disk space on a logical disk.

The output from blocks 202-208 is used to generate a computer database comprising information for defined software activities and linked objects on the file system. The computer database (with associated definitions) is generated and supported with respect to operating system and supported applications.

Block 210 enables a process for discovering defined objects on a monitored endpoint computing system. Monitoring system 14 (of FIG. 1) dynamically attempts to discover defined objects on the file system that are comprised by a logical disk attached to the endpoint computing system. Properties of the discovered objects are monitored and tracked for changes (in the occupied object's disk space) and impact (of occurred changes) on the available free space on the logical disk. Monitoring system 14 (of FIG. 1) monitors disk space on a logical disk (i.e., including disk space occupied by files and folders). Additionally, monitoring system 14 (of FIG. 1) monitors and tracks changes with respect to properties of the objects defined in block 206. Furthermore, monitoring system 14 (of FIG. 1) monitors interaction types between activities and objects defined in block 204. The discovered objects and associated property changes are logged for each logical disk. Historical data for tracked changes is stored in an operational database for each monitored endpoint computing system.

Block 212 analyzes an impact of the objects or groups of objects (with respect to available free space of the logical disk) by determining changes to objects or groups causing the file system to run out of free space. Monitoring system 14 of FIG. 1 (based on collected data from block 210 and historical data) determines (based on interactions between activities and objects and changes) objects causing the file system to run out of free disk space. The result is stored in an operational database for each monitored endpoint computing system. For example, a discovered object (from block 210) to be sorted is selected. The object comprises a maximum increase in occupied free disk space and respectively causes a maximum decrease in the available free disk space. If the object has caused less than 75% of the total decrease of available free disk space, then a next object with a maximum impact from the sorted list is added. The process is repeated until a decrease of available free disk space is equal to 75% or greater. If all discovered objects or group of objects are causing less than 75% of total decrease in the free disk space, then the cause for low disk space is reported as not recognized and a list of all discovered objects and associated software activities are reported as well their contribution to a total decrease in the available free space.

By default, the settings for free disk space thresholds (for event reporting) are set in advance for monitoring purposes.

Block 214 analyzes a cause for low disk space on the logical disk determined based on the logical links established between software activities and defined objects on the file system. When the top contributor(s) objects (i.e., associated with low disk space on the logical disk) are determined (in block 212), monitoring system 14 recognizes specific causes for the low disk space on the logical disk based on the logical links determined in block 208 and the results determined in block 212. In response, the selected objects (from block 212 based on the logical links determined in block 208) are linked with associated software activities determined in block 202). Therefore, a result comprising a cause(s) for low disk space (associated with the associated activities interacting with associated objects on the file system and causing an impact on the available free space of the logical disk) is reported. The result is stored in an operational database for each monitored endpoint computing system.

Figure 3:
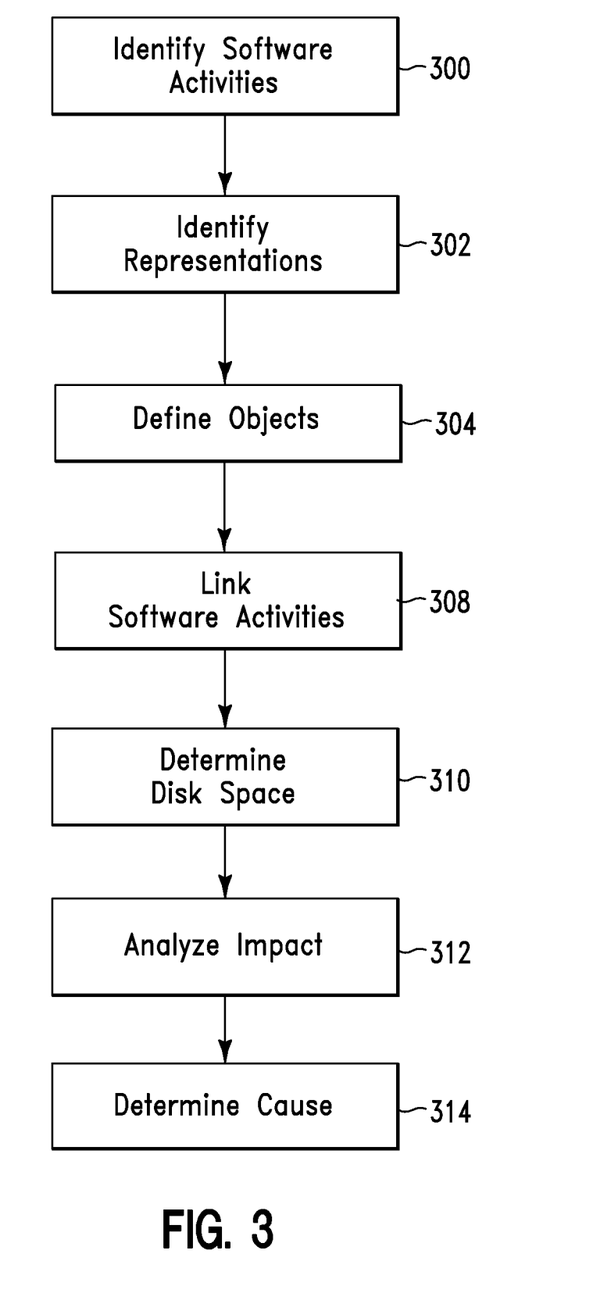
FIG. 3 illustrates an algorithm detailing a process flow enabled by system of FIG. 1 for recognizing causes for low disk space on a logical disk, in accordance with embodiments of the present invention.

FIG. 3 illustrates an algorithm detailing a process flow enabled by system 100 of FIG. 1 for recognizing causes for low disk space on a logical disk, in accordance with embodiments of the present invention. Each of the steps in the algorithm of FIG. 3 may be enabled and executed in any order by a computer processor executing computer code. In step 300, software activities associated with software of an endpoint computing system linked to a file system comprised by a disk storage device are identified. In step 302, representations for the software activities with respect to the file system are identified. In step 304, objects associated with the file system are defined (e.g., based on data associated with the software activities and representations). The objects are associated with functions and features of the software activities. The objects are determined to impact available free space on a logical disk of the disk storage device. The objects may be defined based on defining associated properties including, inter alia, an object name, an object path with respect to the file system, a type of object, object patterns, object extensions, object metadata, etc. In step 308, each software activity is linked with at least one associated object. In step 310, an amount of disk space of the logical disk occupied by each object is determined. A process for determining the amount of disk space may include:
1. Discovering the objects.
2. Discovering interactions between the software activities and the objects of the file system.
3. Monitoring properties of the objects.
4. Tracking changes in properties associated with the objects.
5. Recording historical data associated with the changes.

An alternative process for determining the amount of disk space may include:
1. Tracking changes associated with properties of the objects.
2. Tracking interaction types between the software activities and the objects.

In step 312, an impact of each object with respect to an amount of available free disk space of the logical disk is analyzed. In step 314, a specific cause for the file system exceeding the available free space is determined based on results of the linking of step 308.

Figure 4A:
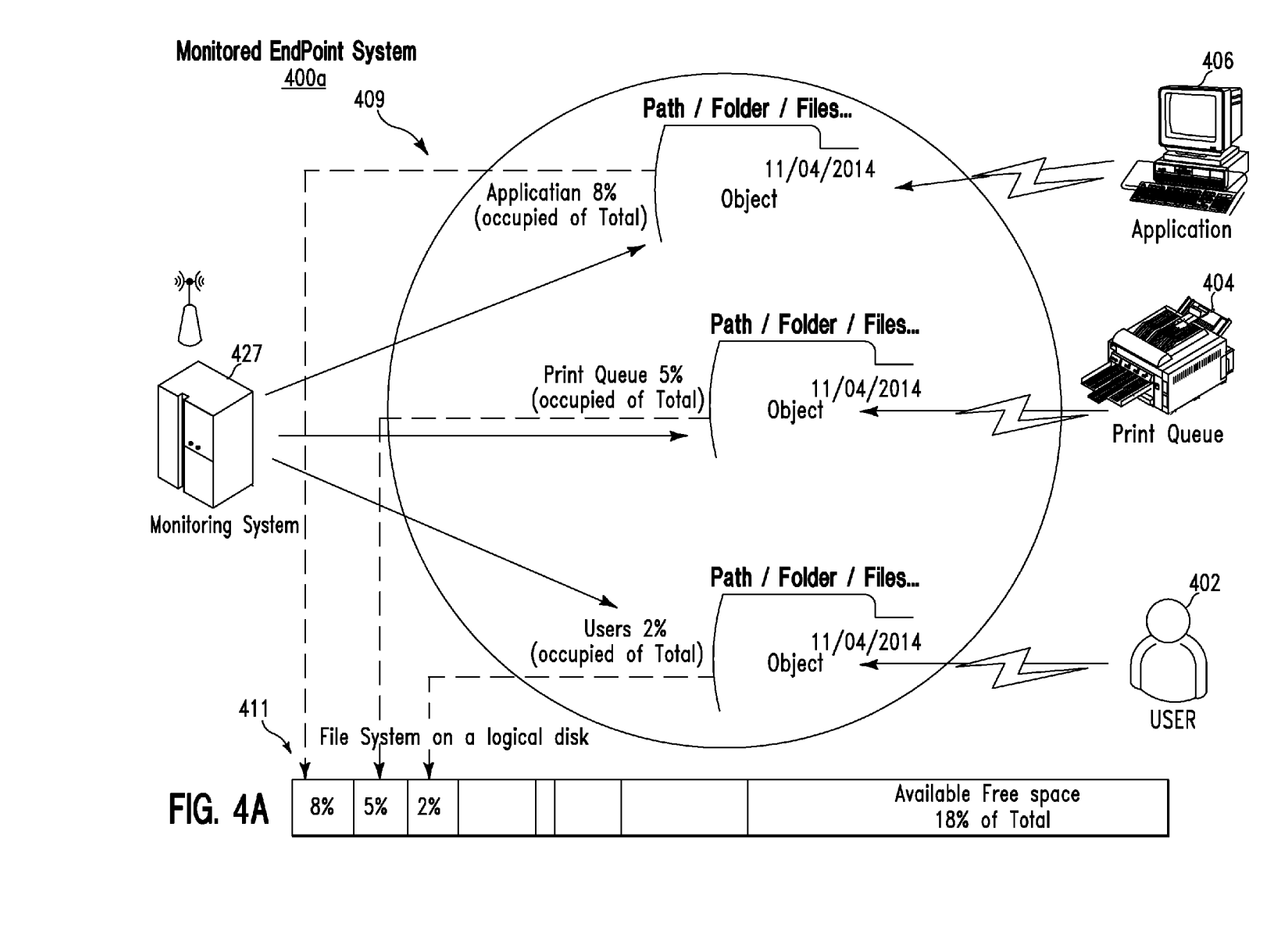
FIGS. 4A and 4B illustrate an example of a monitored endpoint system for determining a cause(s) for low disk space on a logical disk, in accordance with embodiments of the present invention.

FIG. 4A illustrates an example of a monitored endpoint system 400a for determining a cause(s) for low disk space on a logical disk, in accordance with embodiments of the present invention. Monitored endpoint system 400a comprises a logical disk 409 with a file system 411. Monitored endpoint system 400a is communicatively connected to a user 402, a print queue 404, and an application 406. User 402 represents any user activity on monitored endpoint system 400a. Print queue 404 represents output printer jobs stored on the file system 411. Application 406 comprises software installed on the monitored endpoint system 400a. Application 406 provides functionality and features to users. Logical disk 409 is comprised by a storage device connected to monitored endpoint system 400a. File system 411 comprises a logical structure used to control access to storage capacity provided by logical disk 409.

In order to recognize a cause for low disk space available space on logical disk 409, specific features and functionality of an operating system, applications, and user accounts are associated with folders and files located in specific locations (paths) on file system 411. When the operating system, applications, and user accounts perform software activities, they interact with associated folders and files. Any performed software activity or user activity on an operating system level is linked with an organized structure of objects represented on file system 411 by folders and files in specific locations. The software activities may cause changes in allocated disk space due to an increase or decrease of occupied disk space by associated object, thereby impacting an amount of available free disk space on logical disk 409.

The aforementioned example allows a monitoring system 427 to be set to identify objects associated with user 402, print queue 404, and application 406 represented on file system 411 with Path\Folder\Files. Each object occupies amount of total space (i.e., a percent) available on logical disk 409.

In the example illustrated in FIG. 4A, file system 411 comprises 18% of a total space available as free space. File system 411 is occupied as follows:
1. 8% of a total space is occupied by applications 406.
2. 2% of a total space is occupied by users 402.
3. 5% of a total space is occupied by print queue 404.
4. 54% of a total space is occupied by OS 54%
5. 13% of a total space is occupied by program files.

With respect to the example illustrated in FIG. 4A, software module portion of monitoring system 427, dynamically attempts to discover defined objects on file system 411. Properties of the discovered objects are monitored and tracked (for changes in the objects disk space and an impact of the changes with respect to the available free space on logical disk 409) by the software module, as well are tracked any changes.

Figure 4B:
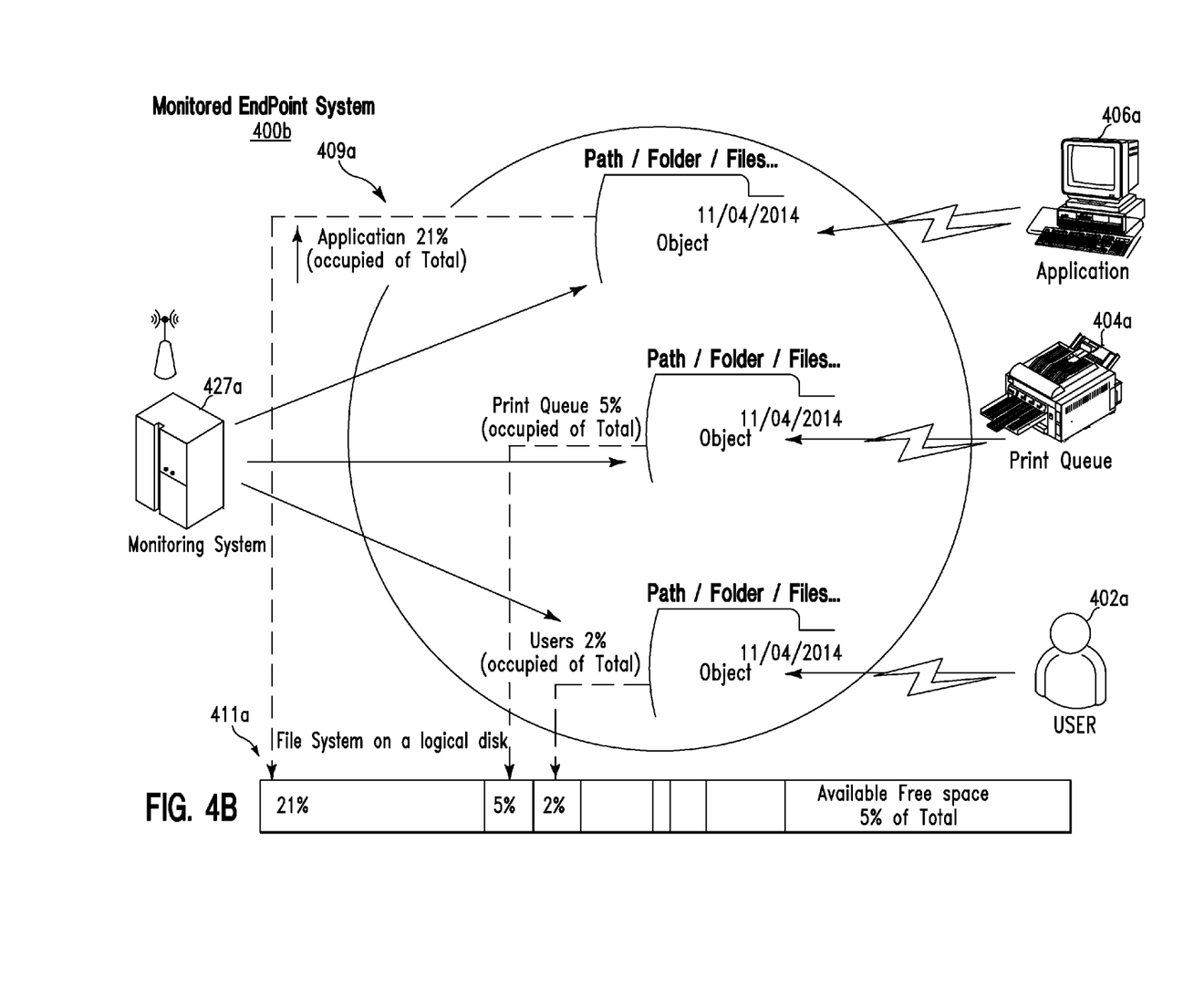

FIG. 4B illustrates an example of a monitored endpoint system 400b for determining a cause(s) for low disk space on a logical disk, in accordance with embodiments of the present invention. FIG. 4B illustrates that available free space meets a monitoring threshold and that the method described in the present invention has been applied to recognize the cause for low disk space. Monitored endpoint system 400b comprises a logical disk 409a with a file system 411a. Monitored endpoint system 400a is communicatively connected to a user 402a, a print queue 404a, and an application 406a. User 402a represents any user activity on monitored endpoint system 400a. Print queue 404a represents output printer jobs stored on the file system 411a. Application 406a comprises software installed on the monitored endpoint system 400a. Application 406a provides functionality and features to users. Logical disk 409a is comprised by a storage device connected to monitored endpoint system 400*a*. File system 411*a* comprises a logical structure used to control access to storage capacity provided by logical disk 409.

In order to monitor available space on logical disk 409*a*, a software module portion of the monitoring system 427*a* determines file system objects connected (via logical links) to user 402*a*, print queue 404*a*, and application 406*a*. The objects impact an available free space on logical disk 409*a*. When available free space of a total disk space falls below a monitoring threshold, the monitoring system 427*a* attempts to recognize a cause for the low disk space on a logical disk. Based on collected historical data for properties of the discovered objects, the objects are sorted by an increase of occupied disk space of a total disk space. In response, the software module portion determines that an object linked to application 406*a* has increased an occupied disk space of the total thereby causing a decrease in available free disk space of a total disk space to fall less than the monitoring threshold.

In the example illustrated in FIG. 4B, file system 411*a* comprises 5% of a total space available as free space. File system 411*a* is occupied as follows:
1. 21% of a total space is occupied by applications 406*a*.
2. 2% of a total space is occupied by users 402*a*.
3. 5% of a total space is occupied by print queue 404*a*.
4. 54% of a total space is occupied by OS 54%
5. 13% of a total space is occupied by program files.

Based on logical links established between software activities of application 406*a* and defined objects on the file system, a cause for low disk space on a logical disk is determined.

In the aforementioned example, the monitoring system 427*a* has reported the incident with a recognized cause as follows:

"WARNING! The free space is 5% of the total. Low disk space on logical disk [volume label {EndPointSYSTEM}] is caused by ["Web Application transactions logging"] associated with object(s) [web logs {wlogs-[yyym-mdd]-[hhmmss].log}] located in [\\Application\\Web Application\\Data\\Logs]. An increase in objects allocated disk space, caused a decrease in available free disk space with [13%]".

Figure 5:
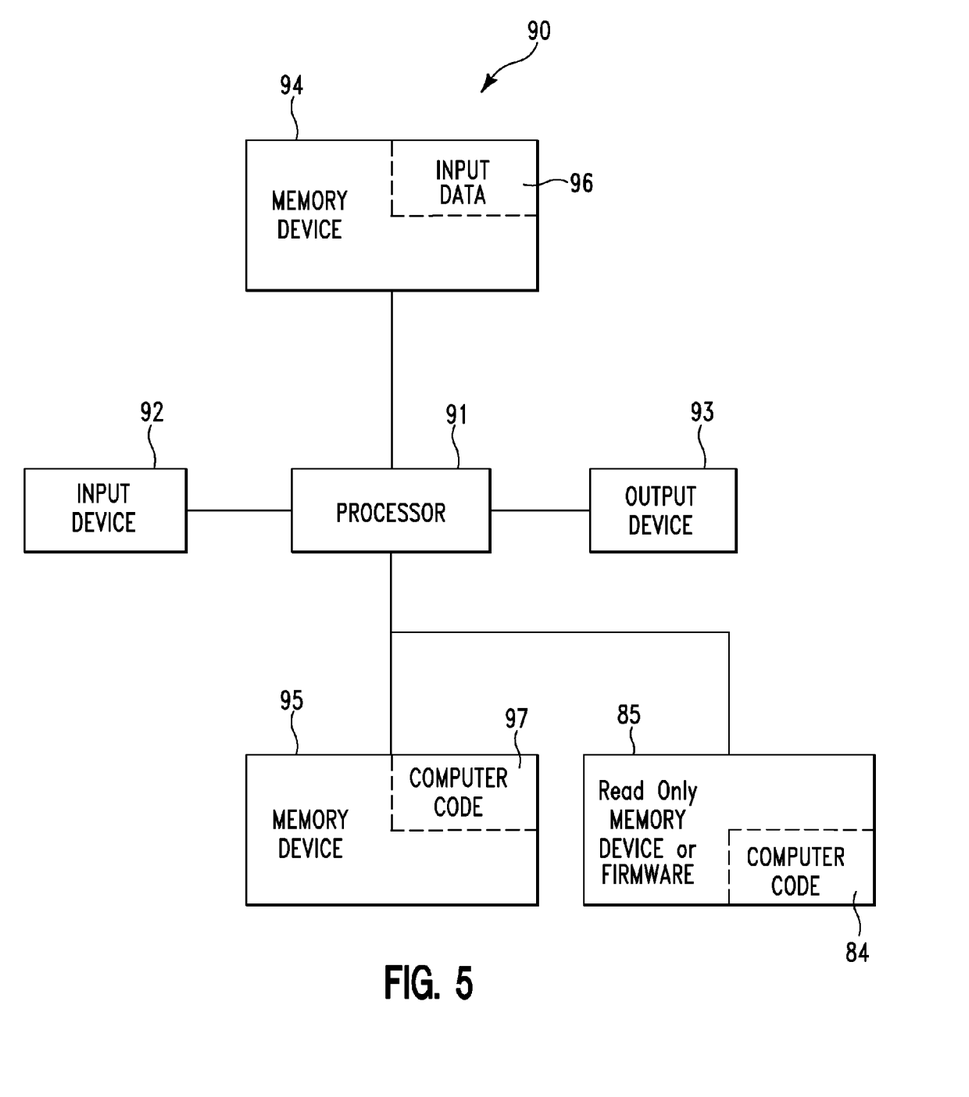
FIG. 5 illustrates a computer system used by the system of FIG. 1 for enabling a process for recognizing causes for low disk space on a logical disk, in accordance with embodiments of the present invention.

FIG. 5 illustrates a computer system 90 (e.g., endpoint computing system 22 and/or monitoring system 14 of FIG. 1) used by or comprised by the system of FIG. 1 for enabling a process for recognizing causes for low disk space on a logical disk, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 (e.g., endpoint computing system 22 and/or monitoring system 14 of FIG. 1) includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for enabling a process for recognizing causes for low disk space on a logical disk. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to recognize causes for low disk space on a logical disk. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for recognizing causes for low disk space on a logical disk. In another embodiment, the invention provides a business method that performs the process steps of the invention on a subscription, advertising, and/or fee basis. That is, a service supplier, such as a Solution Integrator, could offer to enable a process for recognizing causes for low disk space on a logical disk. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
    identifying, by a computer processor of a computing system, software activities associated with software of an endpoint computing system linked to a file system comprised by a disk storage device;
    identifying, by said computer processor, representations for said software activities with respect to said file system;
    defining, by said computer processor, objects associated with said file system, wherein said objects are associated with functions and features of said software activities, wherein said objects impact available free space on a logical disk of said disk storage device;
    logically linking, by said computer processor, each software activity of said software activities with at least one associated object of said objects, wherein said objects logically linked to said software activities define a behavior of an associated software activity causing changes to associated objects on said file system;
    populating, by said processor, said logical disk with said objects logically linked to said software activities;
    periodically monitoring, by said processor, a size of said objects;
    determining, by said computer processor based on results of said periodically monitoring, an amount of disk space of said logical disk of said disk storage device occupied by each object of said objects, wherein said determining said amount of disk space comprises:
        tracking changes associated with properties of said objects, wherein said properties comprise object name properties, object file system paths, object patterns and object associated metadata; and
        tracking interaction types between said software activities and said objects, wherein said interactions comprise object based: creation interactions, modification interactions, access interactions, deletion interactions;
    analyzing, by said computer processor, an impact of each object of said objects with respect to an amount of available free disk space of said logical disk of said disk storage device, wherein said analyzing comprises determining that available storage space in said logical disk falls below a pre-defined limit; and
    determining, by said computer processor based on results of said linking and said analyzing, a specific cause for said file system exceeding said available free space.

2. The method of claim 1, wherein said computing system differs from said endpoint computing system.

3. The method of claim 1, wherein said identifying said software activities is based on documentation of operating systems and applications associated with said software.

4. The method of claim 1, wherein said determining said amount of disk space comprises:
    discovering said objects;
    discovering interactions between said software activities and said objects;
    monitoring properties of said objects;
    tracking changes associated with said objects; and
    recording historical data associated with said changes.

5. The method of claim 1, wherein said defining said objects is based on data associated with said software activities and said representations.

6. The method of claim 1, wherein said defining said objects comprises defining associated properties selected from the group consisting of an object name, an object path with respect to said file system, a type of object, object patterns, object extensions, and object metadata.

7. The method of claim 1, wherein results of said linking illustrate reasons for changes of said objects with respect to said software activities.

8. The method of claim 1, further comprising:
    providing at least one support service for at least one of creating, integrating, hosting, maintaining, and deploying computer-readable code in the computing system, said code being executed by the computer processor to implement: said identifying said software activities, said identifying said representations, said defining, said linking, said determining, said analyzing, and said determining said specific cause.

9. A computing system comprising a computer processor coupled to a computer-readable memory unit, said memory unit comprising instructions that when executed by the computer processor implements a method comprising:
    identifying, by said computer processor, software activities associated with software of an endpoint computing system linked to a file system comprised by a disk storage device;
    identifying, by said computer processor, representations for said software activities with respect to said file system;
    defining, by said computer processor, objects associated with said file system, wherein said objects are associated with functions and features of said software activities, wherein said objects impact available free space on a logical disk of said disk storage device;
    logically linking, by said computer processor, each software activity of said software activities with at least one associated object of said objects, wherein said objects logically linked to said software activities define a behavior of an associated software activity causing changes to associated objects on said file system;
    populating, by said processor, said logical disk with said objects logically linked to said software activities;
    periodically monitoring, by said processor, a size of said objects;
    determining, by said computer processor based on results of said periodically monitoring, an amount of disk space of said logical disk of said disk storage device occupied by each object of said objects, wherein said determining said amount of disk space comprises:
        tracking changes associated with properties of said objects, wherein said properties comprise object name properties, object file system paths, object patterns and object associated metadata; and
        tracking interaction types between said software activities and said objects, wherein said interactions comprise object based: creation interactions, modification interactions, access interactions, deletion interactions;
    analyzing, by said computer processor, an impact of each object of said objects with respect to an amount of available free disk space of said logical disk of said disk storage device wherein said analyzing comprises determining that available storage space in said logical disk falls below a pre-defined limit; and
    determining, by said computer processor based on results of said linking and said analyzing, a specific cause for said file system exceeding said available free space.

10. The computing system of claim 9, wherein said computing system differs from said endpoint computing system.

11. The computing system of claim 9, wherein said identifying said software activities is based on documentation of operating systems and applications associated with said software.

12. The computing system of claim 9, wherein said determining said amount of disk space comprises:
   discovering said objects;
   discovering interactions between said software activities and said objects;
   monitoring properties of said objects;
   tracking changes associated with said objects; and
   recording historical data associated with said changes.

13. The computing system of claim 9, wherein said defining said objects is based on data associated with said software activities and said representations.

14. The computing system of claim 9, wherein said defining said objects comprises defining associated properties selected from the group consisting of an object name, an object path with respect to said file system, a type of object, object patterns, object extensions, and object metadata.

15. The computing system of claim 9, wherein results of said linking illustrate reasons for changes of said objects with respect to said software activities.

16. A computer program product, comprising a computer readable hardware storage device storing a computer readable program code, said computer readable program code comprising an algorithm that when executed by a computer processor of a computing system implements a method, said method comprising:
   identifying, by said computer processor, software activities associated with software of an endpoint computing system linked to a file system comprised by a disk storage device;
   identifying, by said computer processor, representations for said software activities with respect to said file system;
   defining, by said computer processor, objects associated with said file system, wherein said objects are associated with functions and features of said software activities, wherein said objects impact available free space on a logical disk of said disk storage device;
   logically linking, by said computer processor, each software activity of said software activities with at least one associated object of said objects, wherein said objects logically linked to said software activities define a behavior of an associated software activity causing changes to associated objects on said file system;
   populating, by said processor, said logical disk with said objects logically linked to said software activities;
   periodically monitoring, by said processor, a size of said objects;
   determining, by said computer processor based on results of said periodically monitoring, an amount of disk space of said logical disk of said disk storage device occupied by each object of said objects, wherein said determining said amount of disk space comprises:
      tracking changes associated with properties of said objects, wherein said properties comprise object name properties, object file system paths, object patterns and object associated metadata; and
      tracking interaction types between said software activities and said objects, wherein said interactions comprise object based: creation interactions, modification interactions, access interactions, deletion interactions;
   analyzing, by said computer processor, an impact of each object of said objects with respect to an amount of available free disk space of said logical disk of said disk storage device wherein said analyzing comprises determining that available storage space in said logical disk falls below a pre-defined limit; and
   determining, by said computer processor based on results of said linking and said analyzing, a specific cause for said file system exceeding said available free space.

17. The computer program product of claim 16, wherein said computing system differs from said endpoint computing system.

18. The computer program product of claim 16, wherein said identifying said software activities is based on documentation of operating systems and applications associated with said software.

* * * * *